United States Patent [19]

Haferl

[11] Patent Number: 5,313,294
[45] Date of Patent: May 17, 1994

[54] BEAM CURRENT LIMITING ARRANGEMENT HAVING A PEAK AMPLITUDE, RESPONSIVE THRESHOLD

[75] Inventor: Peter E. Haferl, Adliswil, Switzerland

[73] Assignee: RCA Thomson Licensing Corporation, Princeton, N.J.

[21] Appl. No.: 820,902

[22] PCT Filed: Mar. 19, 1991

[86] PCT No.: PCT/US91/01808
§ 371 Date: Jan. 14, 1992
§ 102(e) Date: Jan. 14, 1992

[87] PCT Pub. No.: WO91/15080
PCT Pub. Date: Oct. 3, 1991

[30] Foreign Application Priority Data

Mar. 20, 1990 [GB] United Kingdom ............... 9006250

[51] Int. Cl.⁵ ........................................... H04N 9/16
[52] U.S. Cl. ................................. 348/377; 348/380
[58] Field of Search ............ 358/74, 65, 243, 169–171; H04N 9/16

[56] References Cited

U.S. PATENT DOCUMENTS

| | | | |
|---|---|---|---|
| 4,167,025 | 9/1979 | Willis | 358/243 |
| 4,387,390 | 6/1983 | Reneau et al. | 358/74 |
| 4,451,849 | 5/1984 | Fuhrer | 358/161 |
| 4,549,218 | 10/1985 | Norley et al. | 358/243 |
| 4,587,554 | 5/1986 | Tamura et al. | 358/74 |
| 4,599,642 | 7/1986 | Willis | 358/65 |
| 4,599,643 | 7/1986 | Harlan | 358/74 |
| 4,633,320 | 12/1986 | Willis | 358/243 |
| 4,689,668 | 8/1987 | Sutherland et al. | 358/74 |

FOREIGN PATENT DOCUMENTS 149334  7/1985  European Pat. Off. ....... H04N 5/68

OTHER PUBLICATIONS

"TDA3562A, eine Farbdecoderschaltung mit Sperrpunktregelung-Technische Information 820705", May 7, 1982, Valvo, Hamburg, Germany, pp. 1–6, 9–14, 23–28.

Primary Examiner—James J. Groody
Assistant Examiner—Glenton B. Burgess
Attorney, Agent, or Firm—Joseph S. Tripoli; Peter M. Emanuel

[57] ABSTRACT

An automatic beam current limiting arrangement of a television receiver or display monitor comprises an average beam current limiter coupled to the low side of the high voltage transformer for reducing the contrast of a reproduced image when the average beam current exceeds a threshold and a peak current limiter coupled to the cathodes of the picture tube for controlling a current source which determines the threshold of the average beam current limiter in response to the sum of the cathode currents of the picture tube. In one embodiment, the cathode current sensing circuits comprise the same cathode current sensing circuits utilized in an automatic black level setting arrangement. This beam limiting arrangement allows operation at high contrast levels while inhibiting excessive peak white areas.

12 Claims, 2 Drawing Sheets

BEAM CURRENT LIMITING ARRANGEMENT HAVING A PEAK AMPLITUDE, RESPONSIVE THRESHOLD

FIELD OF THE INVENTION

The present invention pertains to a beam current limiting arrangement such as may be employed in a television receiver or display monitor.

BACKGROUND OF THE INVENTION

Conventional color television receivers and display monitors usually include an average beam current limiter for the protection of the picture tube and the high voltage circuitry. When the average beam current exceeds a predetermined maximum amplitude of, for example, 1.4 milliamperes (ma), the contrast and/or brightness of the reproduced image is decreased by the beam limiter to avoid a further increase of the beam current.

FIG. 1 shows the circuit diagram of a television receiver including a commonly employed average beam current limiter. In a video signal processing channel 10, low level red (r), green (g), and blue (b) color video signal provided by a video signal processing circuit 20 are amplified by respective picture tube (or kinescope) drive amplifiers, generally indicated by reference number 30, to produce high level red (R), green (G), and blue (B) color video signal suitable for directly driving respective cathodes of a picture tube (or kinescope) 40. Although there are three drive amplifiers, one for each color, only drive amplifier 30R for producing the high level red (R) color video signal is shown for simplicity. As is indicated in FIG. 1, low level video signal processing circuit 20 may comprise an integrated circuit (IC), such as the TDA 3562 or TDA 3506 IC, available from Philips of The Netherlands. A high supply voltage for picture tube 40 is developed at the high potential end of a high voltage winding 51 of a horizontal flyback transformer 50 in response to horizontal deflection signals generated by a horizontal deflection circuit 60.

Beam limiting arrangement 70 of the television receiver shown in FIG. 1 is of the conventional type which responds to the average beam current drawn by picture tube 40. Specifically, the beam current of a picture tube 40 is sensed (or "sampled") at the junction of a resistor R1 and a capacitor C1 coupled to the low potential end of high voltage winding 51 of horizontal flyback transformer 50. Resistor R1 and a relatively high voltage supply (e.g., +200 volts) form a constant current source from which current flowing to picture tube 40 through high voltage winding 51 of flyback transformer 50 is drawn. Capacitor C1 serves to remove horizontal rate signal components. The sense point is coupled to the contrast control input of the video signal processing circuit 20 through a low pass filter circuit including a resistor R2 and a capacitor C2 and a switching diode D2. A manual contrast control circuit 80, illustratively shown as including resistors R3, R4 and R5, a potentiometer R6 and a filter capacitor C3, is also coupled to the contrast control input of the video processing circuit 20. A diode D1 clamps the junction of capacitor C2 and diode D2 to a relatively low voltage (e.g., +12 volts) and therefore protects capacitor C2 and diode D2 from the relatively high supply voltage (e.g., +200 volts) which might otherwise be applied to them at relatively low beam currents.

In operation, diode D1 is conductive and diode D2 is non-conductive at low beam currents. The voltage developed across capacitor C1 decreases toward zero as the average beam current increases. Protection diode D1 is rendered non-conductive and thereafter switching diode D2 is rendered conductive as the beam current increases. After switching diode D2 is rendered conductive, the contrast control voltage is decreased as a function of beam current and, in turn, the beam current is also decreased. Diode D2 is rendered conductive when its cathode voltage falls approximately 0.7 volts below its anode voltage. The anode voltage is equal to the contrast control voltage. The point at which diode D2 is rendered conductive and average beam current limiter 70 is activated to reduce the contrast is referred to as the "threshold" or "delay" of average beam current limiter 70. The "threshold" or "delay" of average beam current limiter 70 shown in FIG. 1 is determined by the value of resistor R1 and is fixed.

The rather low dynamic range of a picture tube may cause an overload problem when only the average beam current is limited as in the television receiver shown in FIG. 1. This is illustrated by the waveform shown in FIG. 1—1.

Waveform 1a represents a video signal (V₁) for producing a large white window. Such a window results in a high amount of average beam current which puts the beam limiter into operation. Waveforms 1b and 1c show video signals producing the same amount of average beam current as the signal of waveform 1a because their envelopes cover same area. Assuming the identical contrast setting as for waveforms 1a, 1b and 1c, the staircase signal of waveform 1b produces an ultra bright picture portion, while waveform 1c produces bars of excessive brightness and hot spots on the picture tube mask. Such hot spots may cause the mask to deform in which is sometimes referred to as mask "doming". Thus, the contrast setting for waveform 1c should be lower than for waveform 1a. Unfortunately, beam current limiting arrangement 70 shown in FIG. 1 cannot differentiate between waveforms 1a, 1b and 1c shown in FIG. 1—1. This is so because the beam current is averaged by the aquadag capacitor of picture tube 40 (i.e., the capacitor formed between the inner and outer coatings of picture tube 40) and the voltage developed across capacitor C1 is related to the current which recharges the aquadag capacitor through high voltage winding 51 during horizontal retrace. The actual beam current is the sum of currents flowing through the electron guns of picture tube 40.

SUMMARY OF THE INVENTION

The present invention is concerned with a non-linear beam current limiter which adapts the contrast setting to the video signal content. More specifically, according to an aspect of the present invention, a beam current limiting arrangement comprises a peak detector which senses a video signal related to the cathode currents of the picture tube and which controls the threshold of an average beam current limiter of the type shown in FIG. 1. Preferably, the peak detector includes cathode current sensing elements coupled between the picture tube drive amplifier and the cathodes of the picture tube and advantageously are the same elements which are used to sense the cathode currents during a test interval in which, for example, automatic black level adjustments are made. In a beam current limiting arrangement constructed in accordance with the present invention, the threshold for the average beam current limiter is lowered when excessively bright peak picture portions are present. The threshold for the average beam limiter is unaffected when excessively bright white peak picture portions are absent. Such a beam current limiting arrangement allows a television receiver or display monitor to be operated at high contrast levels without overloading the picture tube and avoids hot spots on the picture tube mask which may cause mask doming.

BRIEF DESCRIPTION OF THE DRAWING

The present invention will be described with reference to an accompanying Drawing in which:

FIG. 1—1, also previously discussed, shows waveforms of various video signal useful in understanding problems of the average current limiter shown in FIG. 1;

FIG. 2—2 shows waveforms of various video signals useful in understanding advantages of the non-linear beam current limiting arrangement shown in FIG. 1.

In the various Figures, corresponding elements are identified in the same or similar manner and certain device types, component values and voltage and current levels are indicated to facilitate an understanding of the invention by way of example.

DETAILED DESCRIPTION OF THE DRAWING

Figure 1:
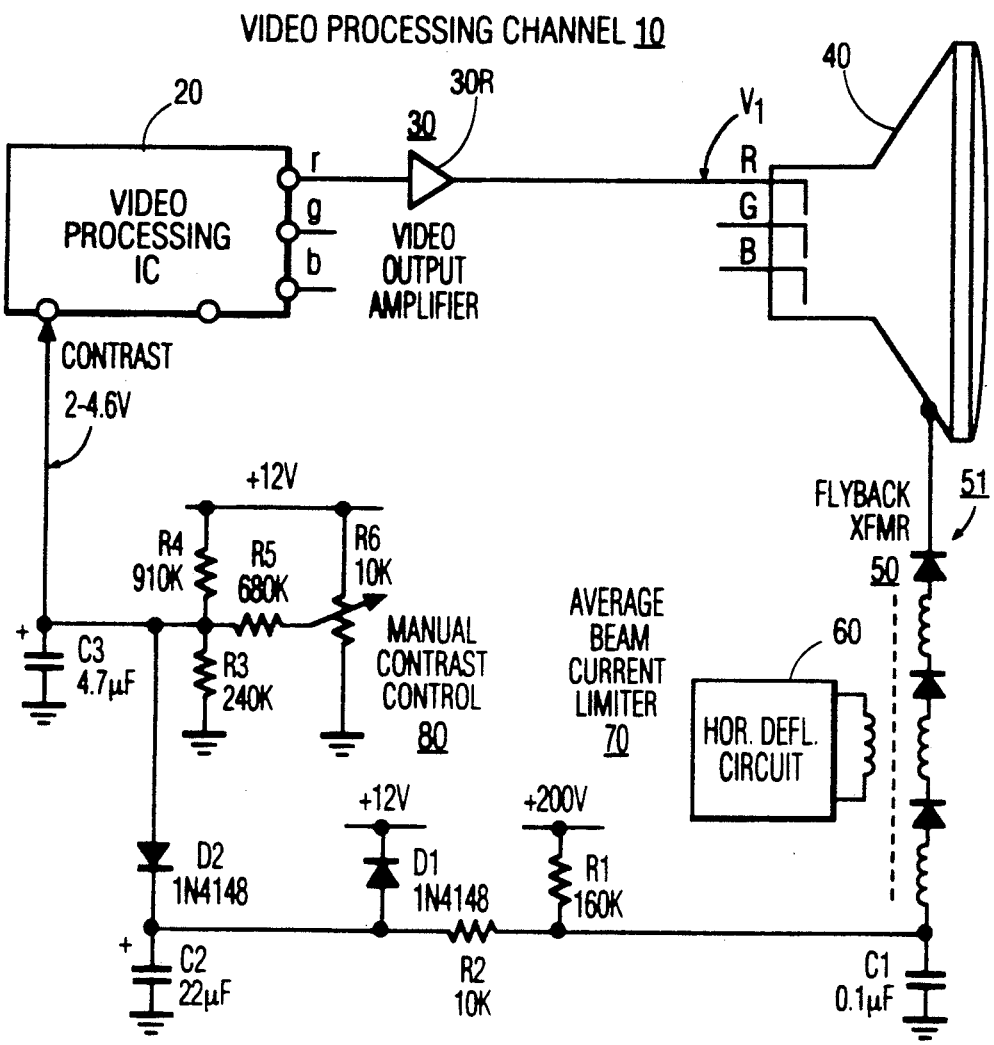
FIG. 1, previously discussed, shows a circuit diagram of a television receiver including an average beam current limiter as is known in the prior art.
Figure 1:
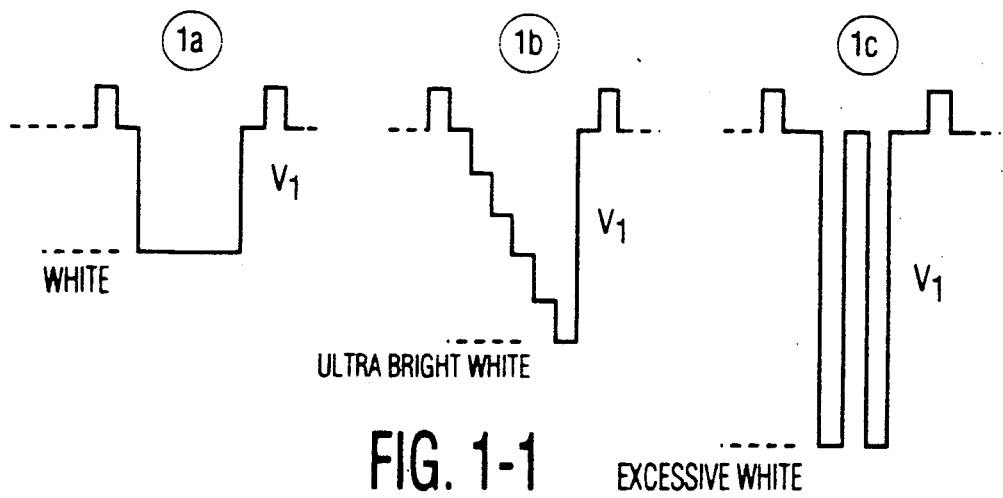
Figure 2:
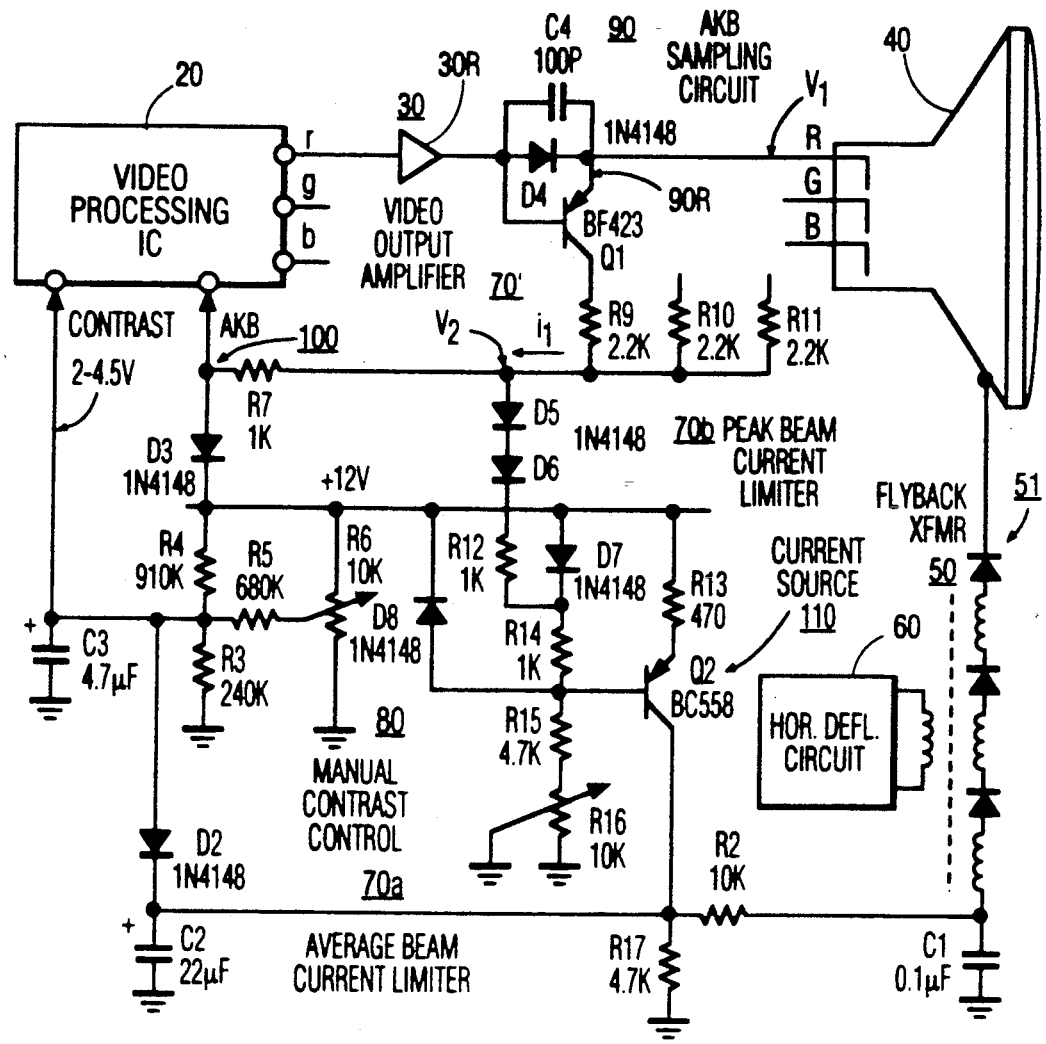
FIG. 2 shows a circuit diagram of a television receiver including a non-linear beam current limiting arrangement constructed in accordance with the present invention.
Figures 1, 2:
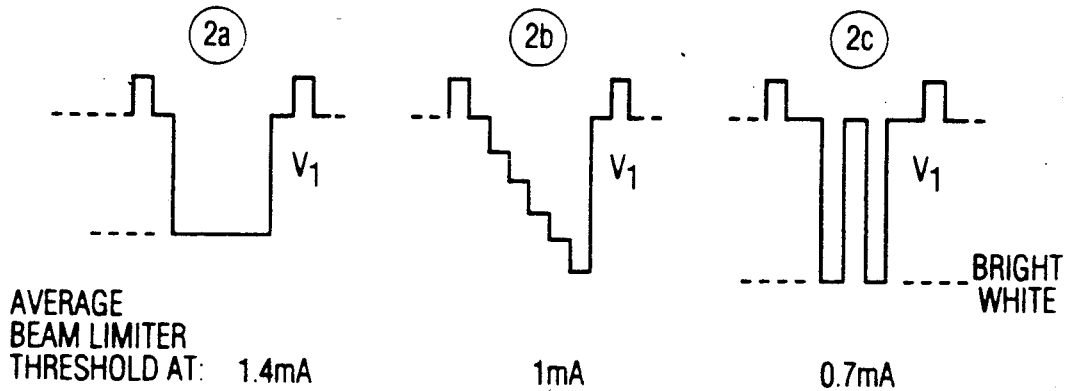

The television receivers shown in FIGS. 1 and 2 are similar with the exception of the beam current limiting arrangement. Accordingly, as indicated above, corresponding elements are identified in the same or similar manner. Basically, beam current limiting arrangement 70' shown in FIG. 2, in accordance with an aspect of the present invention, in addition to an average beam current limiter 70a similar to the one shown in FIG. 1 for reducing the contrast when the average beam current exceeds a threshold, also includes a peak beam current limiter 70b for controlling the threshold of average beam current limiter 70a in response to the actual beam current drawn by picture tube 40.

The actual beam current is sensed utilizing circuits 90 coupled between picture tube drive amplifiers 30 and respective cathodes of picture tube 40. One current sensing circuit is required for each of the three cathodes of picture tube 40. However, only one cathode current sensing circuit 90R associated with the red (R) color video signal is shown for simplicity. Cathode current sensing circuit 90R comprises of an emitter-follower configured transistor Q1 and the base-emitter by-pass circuit including a capacitor C4 and a diode D4 required for driving the cathode capacity. A current substantially equal to the red cathode current flows through resistor R9 connected to the collector of transistor Q1. Similarly, currents substantially equal to the blue and green cathode currents flow through resistors R10 and R11, respectively. The red, green and blue cathode currents are summed to produce a current $i_1$. The current $i_1$ is used to control the threshold of average beam current limiter 70a as will be described in detail below.

Advantageously, cathode current sensing elements 90 are the same elements which are utilized for sensing the cathode currents of picture tube 40 during an adjustment interval in order to automatically adjust parameters such as the black level the reproduced image. Systems for automatically adjusting the black level of the reproduced image are well known and typically are included in part in video signal processing ICs such as the TDA 3506 and TDA 3562. Such systems are sometimes referred to as AKB (automatic kinescope biasing) systems.

Briefly, an AKB system operates by inserting a test pulse corresponding to the desired black level of the reproduced image into each of the red, blue and green video signal channels during respective sequential horizontal line intervals, such as line intervals 22, 23 and 24, of the vertical blanking interval. The test pulses do not produce visible artifacts because the test pulses occur during line intervals in the "overscan" region of the picture tube which is not visible to viewers. The test pulses are not produced at times other than during the AKB interval. Each of the cathode currents which are sequentially produced during the AKB interval is sensed by a respective one of cathode current sensing circuits 90 and coupled via a respective one of resistors R9, R10 and R11 and a resistor R7 associated with the beam current limiting operation to an AKB input terminal of IC 20. Each sensed cathode current is converted to a respective voltage by virtual of a relatively high valued resistors (not shown) within IC 20. The voltage is compared to a reference voltage within IC 20 and a resultant comparison signal is used to set the black level of the respective video signal.

During the AKB interval, current $i_1$ flowing to the AKB input terminal of IC 20 corresponds to a signal "black level" cathode current and is therefore very low. Accordingly, the internal resistor of IC 20 for developing the voltage which is compared to the AKB reference voltage has to have a relatively high resistance value in order to develop a sufficiently high voltage for comparison. During active image intervals, current $i_1$ represents the sum of the cathode currents and is typically much larger than it is during the AKB interval. As a result, a relatively high voltage may be developed across the internal cathode current sensing resistor which may damage IC 20. A sampling circuit 100 including a resistor R and a diode D3 is provided to develop a voltage $v_2$ which is proportional to current $i_1$ while protecting IC 20 during active image intervals. The voltage $v_2$ is converted to a current which determines the threshold of average beam current limiter 70a by a controllable current source 110 including a transistor Q2, diodes D5, D6, and D7, resistors R12, R13, R14 and R15, and potentiometer R16. More specifically, the current supplied through the collector of transistor Q2 divides between the resupply current flowing to capacitor C1 through resistor R2 and the current flowing through resistor R17. Diode D2 is rendered conductive when the voltage at its cathode falls approximately 0.7 volts below the voltage at its anode. The voltage at the cathode of diode D2 is determined by the current resistor R17 is the difference between the current supplied by transistor Q2 and the resupply current of picture tube 40 flowing through high voltage winding 51 of flyback transformer 50. Therefore, the current supplied by transistor Q2 determines the level of average beam current at which diode D2 is rendered conductive and therefore the threshold of average beam current limiter 70a.

In beam current limiting arrangement 70', a diode D8 is coupled between the base of transistor Q2 and the +12 volt supply line in order to protect transistor Q2 from reverse base-to-emitter breakdown voltages which may be developed when the aquadag capacitor of picture tube 40 is initially charged.

In beam current limiting arrangement 70' shown in FIG. 2, a diode corresponding to diode D1 of beam current limiting arrangement 70 shown in FIG. 1 is not needed since its protection function is performed by current source 110. More specifically, at low beam currents, the voltage developed at the cathode of diode D2 is limited by the current supplied by current source 110.

In operation, during the AKB interval, when the current $i_1$ is low, the voltage developed at the junction of resistor R7 and the internal sampling resistor within IC 20 is below +12 volts. As a result, didoes D3, D5 and D6 are reverse biased and therefore non-conductive. As a result, all of current $i_1$ flow to the AKB input terminal of IC 20.

During the active image interval, current $i_1$ represents the sum of the cathode currents and may increase to the point at which peak beam current limiting action occurs as follows. Diode D7 is forward biased and therefore conductive at low levels of current $i_1$ and remains so until the current $i_1$ reaches a threshold value determined by resistors R14 and R15 and potentiometer R16. As long as diode D7 is conductive, the base voltage of transistor Q2 remains substantially constant. Consequentially the emitter and collector currents of transistor Q2 and therefore the threshold of average beam current limiter 70a remain substantially constant. When current $i_1$ increases to the point at which a voltage slightly (by approximately 0.7 volts) greater than +12 volts is developed at the junction of resistor R7 and the internal sampling resistor within IC 20, diodes D3, D5 and D6 are rendered conductive. However, diode D7 remains conductive. At this time, the voltage at the AKB terminal of IC20 is clamped to approximately +12.7 volts. Current $i_1$ divides equally between the path including resistor R7 and the path including resistor R12 since diode D5 compensates for diode D3, diode D6 compensates for diode D7 and resistor R12 has the same value as resistor R7. Diode D7 is rendered non-conductive when the voltage at the junction of resistor R12 and resistor R14 reaches approximately +12 volts or, viewed another way, when the current flowing through resistor R12 substantially equals the current flowing through resistor R14. Thereafter, the base voltage of transistor Q2 is allowed to increase as the current $i_1$ increases. As the base voltage of transistor Q2 increases, the collector current decreases and consequently the threshold of average beam current limiter 70a also decreases. The collector current of transistor Q2 and the threshold of average beam current limiter 70a continue to decrease until current $i_1$ increases to the point at which the base voltage of transistor Q2 is slightly greater than +12 volts and diode D8 is rendered conductive. Thereafter, the collector current of transistor Q2 and the threshold of average beam current limiter 70a are substantially zero.

By way of numerical example, assume that contrast potentiometer R6 is set to produce the maximum contrast control voltage of +4.5 volts so as to produce maximum contrast and that it is desired that the average beam current limiter 70a is to be activated when 1.4 milliamperes (ma) of average beam current is drawn. Under these circumstances, since the voltage at the anode of diode D2 is +4.5 volts, diode D2 will be rendered conductive when the voltage developed across resistor R17 decreases to approximately +3.8 volts (+4.5 volts−0.7 volts). The latter corresponds to a current of approximately 0.8 ma (3.8 volts/4.7 kohm) flowing through resistor R17. Therefore, the collector current of transistor Q2 should be set to 2.2 ma (0.8 ma+1.4 ma) before peak beam current limiter 70b is activated because diode D2 is to be rendered conductive when the current flowing through resistor R17 is 0.8 ma and the current drawn through resistor R2 is 1.4 ma. A collector current of 2.2 ma causes a voltage drop across emitter resistor R13 of approximately 1 volt (2.2 ma×470 ohm). Until peak beam current limiter 70b is activated, diode D7 is conductive and the voltage drop across it compensates for the base-emitter voltage drop of transistor Q2. Accordingly, potentiometer R16 should be adjusted so that a voltage drop of 1 volt is developed across resistor R14 (1 kohm) to establish a average beam current threshold of 1.4. ma before peak beam current limiter is activated. Under these circumstances, diode D7 will be rendered conductive when the current ($\frac{1}{2}i_1$) flowing through diodes D5 and D6 and resistor R12 increases to 1 ma or current $i_1$ increases to 2 ma. If peak beam current representative current $i_1$ increases beyond 2 ma, the collector current of transistor Q2, and consequentially the threshold of average beam current limiter 70b, will decrease.

The above described non-linear beam current limiting operation is graphically illustrated by waveforms 2a, 2b and 2c shown in FIG. 2—1. For the waveforms shown in FIG. 2—1, it is assumed that contrast control potentiometer R6 is set to produce the highest contrast (i.e., the wiper arm of potentiometer R6 is set to provide a contrast control voltage of +4.5 volts). Waveform 2a corresponds to the display of a large white window. It is assumed that beam limiter threshold control potentiometer R16 has been adjusted so that the average beam current is limited at 1.4 mA when waveform 2a is produced. Peak beam current representative current $i_1$ is about 25% higher than the average beam current because current $i_1$ is substantially equal to zero during the blanking intervals. Thus, current $i_1$ is substantially equal to 1.8 mA when waveform 2a is produced and beam current limiting arrangement 70' operates in its linear range because peak beam limiter 70b has not been activated. When waveform 2b is produced, current $i_1$ increases during the white peak of the staircase waveform. This causes diode D7 to become non-conductive, resulting in a reduction of the collector current of transistor Q2 and, therefore, the threshold of average beam current limiter 70a to, for example, about 1 ma. As a result, average beam current is limited at 1 mA. The amplitude of current $i_1$ is even higher at the peak of waveform 2c. This causes a further decrease of the collector current of transistor Q2 and, therefore, the threshold of average beam current limiter 70a to, for example, about 0.7 mA. As a result, the average beam current is limited at a relatively low value of 0.7 mA.

Thus, the amplitude of the cathode drive voltages (V1) are controlled by automatically shifting the threshold of the average beam current limiter, as is indicated by waveforms 2a, 2b and 2c in FIG. 2—1, in order to make the response of beam current limiting arrangement 70' to video signals corresponding to relatively large areas and to video signals corresponding to relatively small areas more uniform. This avoids the need for a manual contrast adjustment compromise to account for the differences between signals having waveforms such as 2a and 2c and allows the television receiver or monitor to be operated at high contrast levels without blooming or potentially damaging hot spots.

It is noted that full screen multiburst signal such as those corresponding to text may produce an overporportional decrease of the threshold of average beam current 70a. This is caused by the charge currents for the cathode capacitances. The charge currents contribute to current $i_1$, resulting in a decreased contrast. This may be a desirable effect to improve readability when full screen text is displayed.

It is furthermore noted that beam current limiting arrangement 70' combines the control functions of average beam current limiter 70a and peak current limiter 70b in an interdependent fashion. More specifically, potentiometer R16 determines the thresholds (or delays) for both average beam current limiter 70a and peak beam current limiter 70b. As a result, the thresholds automatically track each other. For example, adjusting potentiometer R16 to provide 2 mA threshold for average beam current limiter 70a results in a 2.6 mA threshold for peak current limiter 70b. Such tracking relationship is desirable because component tolerances and the use of different picture tubes in a chassis may necessitate threshold adjustments. It will be understood that various modifications may be made to the described embodiment.

For example, while the beam current is limited by controlling the contrast of the image in the described embodiment, the beam current may also be reduced by controlling the brightness of the image, either in conjunction with contrast or alone.

In addition, while the AKB sensing circuitry is advantageously used to also sense the actual beam current drawn by the picture tube, other sense circuitry may be used for this purpose. For example, it is possible to use the low level red (r), green (g) and blue (b) video signals. However, use of these signals may only produce an approximation of the actual beam currents since they do not represent adjustments made within picture tube drive amplifiers 30 to account for picture tube tolerances. Therefore it is preferable to sense the cathode currents directly at the cathodes.

Furthermore, while the amplitude of all three color signals are sensed in the preferred embodiment of the invention, it is possible to sense less than all three of the color signals, e.g., only the green color signal which most closely corresponds to the luminance information. However, such a sensing arrangement will not produce an accurate representation of the actual beam current since the actual beam current corresponds to the sum of the three cathode currents.

These and other modifications are contemplated to be within the scope of the present invention defined by the following claims.

I claim:

1. In a display system, apparatus comprising:
a video signal processing channel for processing an video input signal to produce an video output signal suitable for display;
a power supply;
an image display device coupled to said video signal processing channel and to said power supply and drawing current from said power supply in response to said video output signal;
means coupled to said power supply for sensing the average current drawn by said display device from said power supply;
means coupled between said video signal processing channel and said average current sensing means for reducing an image property determining characteristic of said video output signal when said average current drawn by said display device from said power supply exceeds a controllable threshold;
means coupled to said video signal processing channel for sensing the amplitude of said video output signal; and
means coupled to said reducing means for setting said threshold of said reducing means in response to the amplitude of video output signal.

2. The apparatus defined in claim 1, wherein:
said display device is coupled to a first terminal of said power supply;
said average current sensing means includes a filter circuit coupled to a second terminal of said power supply for filtering a current supplied to said display device; and
said threshold setting means includes a controllable current source responsive to the amplitude of said video output signal and coupled to said filter circuit to supply current to said filter circuit.

3. The apparatus as defined in claim 1, wherein:
said display device is a picture tube including at least one cathode;
said video signal processing channel includes a picture tube drive amplifier coupled to said cathode for producing said video output signal so that it is suitable for directly driving said cathode of said picture tube;
said video signal sensing means includes a current sensing element coupled to said cathode; and
said threshold setting means is responsive to the current sensed by said current sensing means for setting said threshold of said reducing means.

4. The apparatus defined in claim 1, wherein:
said display device is a color picture tube including there cathodes;
said video signal processing channel includes three picture tube drive amplifiers coupled to respective ones of said cathodes for producing three respective color video output signals suitable for directly driving respective ones of said cathodes of said picture tube;
said video signal sensing means includes three current sensing elements coupled to respective ones of cathodes of said picture tube; and
said threshold setting means is responsive to a combination of the three cathode currents sensed by said current sensing elements for setting said threshold of said reducing means.

5. The apparatus defined in claim 1, wherein:
said display device is a picture tube including at least one cathode;
said video signal processing channel includes a picture tube drive amplifier coupled to said cathode for producing said video output signal so that it is suitable for directly driving said cathode of said picture tube;
said video signal processing channel also includes means for setting said video output signal to a predetermined test level during a test interval; means coupled to said cathode for sensing the current flowing to said cathode during said test interval; and means for adjusting a characteristic of said video output signal in response to the cathode current sensed during said test interval;

said video signal sensing means comprises said means coupled to said cathode for sensing the current flowing to said cathode during said test interval; and said threshold setting means is responsive to the current sensed by said cathode current sensing means during times other than said test interval for setting said threshold of said reducing means.

6. The apparatus defined in claim 1, wherein:

said picture tube is a color picture tube including three cathodes;

said video signal processing channel includes three picture tube drive amplifiers coupled to respective ones of said three cathodes for producing three respective color video output signals suitable for directly driving respective ones of said three cathodes of said picture tube;

said video signal processing channel includes means for setting said three color video output signals to respective test levels during a test interval; three means coupled to respective ones of said three cathodes for sensing three respective cathode currents during the said test interval; and means for adjusting a characteristic of said three color video output signals in response to said three respective cathode currents sensed during the said test interval;

said video signal sensing means includes said three cathode current sensing means; and said threshold setting means is responsive to a combination of said three cathode currents sensed by said cathode current sensing means during times other than said test interval for setting the threshold of said reducing means.

7. In a display system, apparatus comprising:

a picture tube having at least one cathode;

a video signal processing channel for processing an video input signal to produce a video output signal; said video signal processing channel including a picture tube drive amplifier for producing said output video signal so that it is capable of directly driving said cathode of said picture tube;

a power supply;

said picture tube being coupled to said video signal processing channel and to said power supply and drawing current from said power supply in response to said video output signal;

means coupled to said power supply for sensing the average current drawn by said picture tube from said power supply;

means coupled to said cathode of said picture tube amplifier for sensing the current flowing to said cathode; and means coupled between said video signal processing channel and said average current sensing means for reducing the peak to peak amplitude of said video output signal in response to said average current drawn by said picture from said power supply when said average current exceeds a controllable threshold;

means coupled to said video signal processing channel for sensing the amplitude of said video output signal; and means coupled to said reducing means for setting said threshold of said reducing means in response to the amplitude of said video output signal.

8. The apparatus defined in claim 1, wherein:

said image property determining characteristic of said video output signal is the peak to peak amplitude of said video output signal and said image property is contrast.

9. The apparatus defined in claim 7, wherein:

said image display device is coupled to a first terminal of said power supply;

said average current sensing means includes a filter circuit coupled to a second terminal of said power supply for filtering a current supplied to said picture tube; and said threshold setting means includes a controllable current source responsive to the amplitude of said video output signal and coupled to said filter circuit to supply current to said filter circuit.

10. The apparatus defined in claim 7, wherein:

said video signal processing channel also includes means for setting said video output signal to a predetermined test level during a test interval; means coupled to said cathode for sensing the current flowing to said cathode during said test interval; and means for adjusting a characteristic of said video output signal in response to the cathode current sensed during said test interval;

said video signal sensing means comprises said means coupled between to said cathode for sensing the current flowing to said cathode during the test interval; and said threshold setting means is responsive to the current sensed by said cathode current sensing means during times other than said test interval for setting said threshold of said reducing means.

11. The apparatus defined in claim 7, wherein:

said picture tube is a color picture tube includes three cathodes;

said video signal processing channel includes three picture tube drive amplifiers coupled to respective ones of said three cathodes for producing three respective color video output signals suitable for directly driving respective ones of said three cathodes of said picture tube;

said video signal processing channel includes means for setting said three color video output signals to respective test levels during a test interval; three means coupled to respective ones of said three cathodes for sensing three respective cathode currents during said test interval; and means for adjusting a characteristic of said three color video output signals in response to the three respective cathode currents sensed during said test interval;

said video signal sensing means includes said three cathode current sensing means; and said threshold setting means is responsive to a combination of said three cathode currents sensed by said cathode current sensing means during times other than said test interval for setting the threshold of said reducing means.

12. The apparatus defined in claim 11, wherein:

said combination is theism of said three cathode currents sensed by said cathode current sensing means during times other than said test interval.

* * * * *

UNITED STATES PATENT AND TRADEMARK OFFICE
CERTIFICATE OF CORRECTION

PATENT NO. : 5,313,294

DATED : May 17, 1994

INVENTOR(S) : Peter E. Haferl

It is certified that error appears in the above-identified patent and that said Letters Patent is hereby corrected as shown below:

Column 10, line 65, that portion reading "is theism" should read

-- is the sum -- .

Signed and Sealed this

Sixteenth Day of August, 1994

Attest:

BRUCE LEHMAN

Attesting Officer

Commissioner of Patents and Trademarks